March 9, 1926.    1,576,062
J. C. PASSMORE
NUT LOCK
Filed Oct. 21, 1925
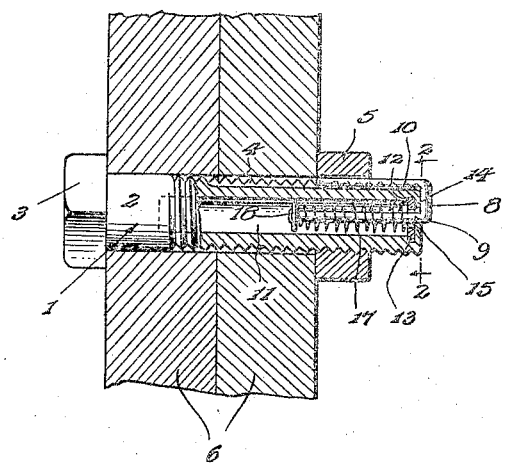
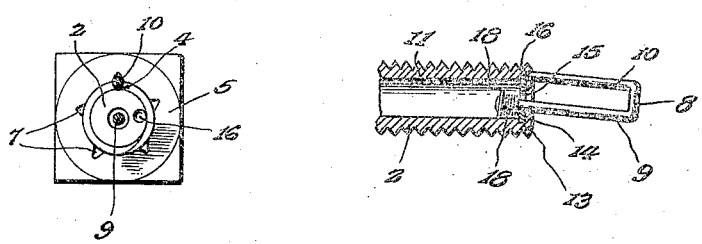
Inventor
J. C. Passmore.
By Patented Mar. 9, 1926.

1,576,062

UNITED STATES PATENT OFFICE.

JOSEPH C. PASSMORE, OF COSHOCTON, OHIO.

NUT LOCK.

Application filed October 21, 1925. Serial No. 64,026.

*To all whom it may concern:*

Be it known that I, JOSEPH C. PASSMORE, a citizen of the United States, residing at Coshocton, in the county of Coshocton and State of Ohio, have invented certain new and useful Improvements in Nut Locks, of which the following is a specification.

This invention relates to a nut lock and one object of the invention is to provide an improved type of locking pin carried by the bolt and movable into and out of position for locking engagement with the nut, the pin or fastener being so constructed and mounted that it will be normally held in position for engaging the nut, but permitted of being readily moved to a releasing position when it is desired to tighten or remove the nut.

Another object of the invention is to so construct and mount the fastener that it may be permanently carried by the bolt, but permitted of being moved to an inoperative position and extend longitudinally from the free end of the bolt in such position that it will not interfere with the nut being put in place or removed.

Another object of the invention is to provide a nut lock in which the fastener will be of a simple construction and permitted of being freed from locking engagement with the nut without being destroyed or rendered unfit for further use.

This invention is illustrated in the accompanying drawings, wherein,

Figure 1 is a view showing the improved nut lock partially in side elevation, but principally in longitudinal section, Figure 2 is sectional view taken along the line 2—2 of Figure 1, and Figure 3 is a fragmentary longitudinal sectional view through the shank of the bolt with the nut engaging fastener moved to an inoperative position.

The bolt which is indicated in general by the numeral 1 is provided with a shank 2, having a head 3 at one end. The shank may be threaded for its entire length, or only for a portion of its length, and is provided with a longitudinally extending groove 4 which intersects the threads and is of a depth slightly greater than the depth of the threads. The nut 5 which is screwed upon the shank of the bolt after the bolt has been passed through alined openings formed in the boards 6, or other members to be secured, has its threaded bolt receiving bore formed with grooves 7 spaced from each other about the bore of the nut and adapted to successively register with the groove 4, as the nut is turned upon the bolt. In the present illustration, the nut has been shown provided with five of the grooves 7, but it will be understood that any number of grooves desired may be formed in the nut.

After the nut has been screwed tightly upon the bolt and rotation thereof stopped with one of the grooves 7 registering with the groove 4 of the bolt, it is desired to have the nut secured so that it cannot work loose. Therefore, there has been provided a fastener 8 which is formed of heavy wire or the like. This fastener is of a U-shaped construction to provide arms 9 and 10, one of which projects into the axially extending pocket 11 of the bolt shank, and the other of which is adapted to engage in the groove 4 of the bolt and co-operating groove 7 of the nut, so that the nut will be prevented from working loose. The pocket 11 may, if so desired, extend the full length of the bolt and thereby form a hollow bolt which will be light in construction and at the same time very strong, or it may only extend for a portion of the length of the bolt shank as illustrated in Figure 1. The outer end portion of the pocket is of increased diameter to provide a seat 12 and this seat receives a perforated disc 13 held in place by an overlapping annular flange or lip 14. The opening 15 in the head or disc 13 through which the inner arm 9 of the fastener extends is of a diameter materially greater than the diameter of the arm 9, so that when the fastener is drawn outwardly, as shown in Figure 3, it may be tilted diametrically of the bolt shank and the free end of the outer arm 10 seated in the notch 16 formed in the end of the bolt. It will be readily understood from an inspection of Figure 3 that when the fastener is drawn outwardly and tilted to the position shown, it will be so disposed with respect to the bolt that the nut may be readily slipped along the fastener into and out of engagement with the bolt. The fastener is to be normally held in an operative position, so that it will be prevented from accidentally moving out of locking engagement with the nut. This is accomplished by means of a spring 17 which is coiled about the inner arm 9 with one end engaging the disc or head 13, and its other end engaging an abutment 18 secured upon the free end of the fastener arm.

When this device is in use the bolt is passed through the openings formed in the boards or other members 6 to be secured together, with the free end portion of its shank protruding and the fastener is drawn outwardly and moved to the inoperative position shown in Figure 3, in which position it will be retained by the spring 18. The nut is now passed longitudinally of the extended fastener into engagement with the free end of the bolt shank and screwed upon the bolt in the usual manner until it engages the adjacent member 6. The nut will then be tightened the desired amount and rotation of the nut stopped with one of the grooves 7 registering with the groove 4. The fastener is now drawn outwardly a sufficient distance to move the end of the arm 10 out of the notch 16 and the fastener tilted to position the arm 10 in the groove 4 of the bolt, so that when the spring draws the fastener inwardly to the position shown in Figure 1, the arm will enter the groove 7 registering with the groove 4 and very securely lock the nut against further rotation. It will therefore be seen that as long as the fastener is in an operative position the nut cannot work loose. When it is desired to remove the nut, or tighten it an additional amount, the fastener is drawn outwardly and returned to the inoperative position, so that the nut is released and permitted of being tightened the desired extent, or removed from the bolt. The nut lock is therefore very effective in operation and is so constructed that it is not damaged and prevented from being again used.

Having thus described the invention, what I claim is:

A nut lock comprising a threaded bolt having a longitudinally extending groove intersecting its threads and an axially extending pocket opening through its end, the outer end portion of the walls of said pocket being reduced in thickness to form an internal annular shoulder and lip extension, a disc seated against said shoulder and formed with an opening, the lip extension of said bolt being turned inwardly to overlie said disc and engage the outer face thereof about the opening, a U-shaped fastener having one arm extending into said pocket through the opening of said disc and its other arm adapted to be slid into and out of the groove of said bolt, an abutment adjacent the free end of the inner arm of said fastener, a spring coiled about said inner arm between said abutment and disc to yieldably resist outward movement of the fastener to an inoperative position, and a nut screwed upon said bolt and having its threaded bore formed with grooves to be selectively moved into registry with the groove of said bolt and receive a portion of the outer arm of the fastener to lock the nut against turning.

In testimony whereof I affix my signature.

JOSEPH C. PASSMORE.